United States Patent
Mino et al.

(10) Patent No.: US 6,706,359 B2
(45) Date of Patent: Mar. 16, 2004

(54) OPTICAL INFORMATION RECORDING MEDIUM AND METHOD FOR MANUFACTURING THE SAME

(75) Inventors: Norihisa Mino, Nara (JP); Eiji Ohno, Hirakata (JP); Hidemi Isomura, Moriguchi (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 40 days.

(21) Appl. No.: 10/104,987

(22) Filed: Mar. 22, 2002

(65) Prior Publication Data
US 2002/0176957 A1 Nov. 28, 2002

(30) Foreign Application Priority Data
Mar. 23, 2001 (JP) ........................................ 2001-084766

(51) Int. Cl.$^7$ ................................................. B32B 3/02
(52) U.S. Cl. ....................................... 428/64.1; 428/447
(58) Field of Search ............................. 428/64.1, 64.4, 428/447, 913; 430/270.11, 495.1, 945; 369/283, 288

(56) References Cited

U.S. PATENT DOCUMENTS 5,258,225 A * 11/1993 Katsamberis ................ 428/331
5,268,211 A    12/1993 Soga et al.
6,558,768 B2 * 5/2003 Noguchi ...................... 428/64.1
6,576,320 B2 * 6/2003 Hayashida .................. 428/64.1

FOREIGN PATENT DOCUMENTS

| EP | 1146510 | * 10/2001 |
| JP | 6-44617 | 2/1994 |
| JP | 6-267109 | 9/1994 |
| JP | 6-316029 | 11/1994 |

* cited by examiner

Primary Examiner—Elizabeth Mulvaney
(74) Attorney, Agent, or Firm—Merchant & Gould P.C.

(57) ABSTRACT

An optical information recording medium includes a reflective film, a recording film and a protective film on a substrate. The protective film is provided with a surface layer on a side opposite to the substrate. On an outer layer of at least one selected from the substrate and the protective film, a hard coat resin layer is formed. On an outer layer of the hard coat resin layer, a chemisorptive film including organic silane molecules represented by the general formula $R_{4-m-n}SiR'_m Z_n$—(wherein R is a group including a carbon chain with a carbon number of 3 to 25, Z is O, N or S, n is 1, 2 or 3, R' is hydrogen or an alkyl group with a carbon number of 1 to 3, and m is 0, 1 or 2) is formed by covalent bonding with the hard coat layer.

21 Claims, 5 Drawing Sheets

Laser light

OPTICAL INFORMATION RECORDING MEDIUM AND METHOD FOR MANUFACTURING THE SAME

FIELD OF THE INVENTION

The present invention relates to high-density recording media, which can be written on and read optically, such as optomagnetic recording media. More specifically, the present invention relates to recording media provided with a resin film and a super-thin coating film, in which a compound including a hydrolysable group, such as a silane compound, is chemically bonded to a substrate surface.

BACKGROUND OF THE INVENTION

A variety of surface coatings are known conventionally, and typical examples include fluorine resin coatings. Fluorine resin coatings are frequently used as stain-resistant coatings in products that are exposed to water, for example in products related to laundry or cooking, and they are very effective as stain-resistant coatings.

On the other hand, surface modifying agents, such as silane coupling agents, have been used increasingly in recent years, and examples thereof include treatments making the surface of glass stain-resistant and treatments making the surface of glass water-repellent.

Such fluorine resins are sometimes coated on the surface of metal workpieces, but this is very costly. Furthermore, the anti-sticking function when used as a stain-resistant coating may cause a decrease in the adherence to the metal layer below it or decrease its durability due to exfoliation, and the adherence is improved by roughening the layer below or introducing a filler. Therefore, fluorine resin coatings tend to be thick, for example several microns or more. For this reason, fluorine resin coatings may become semi-transparent or non-transparent, and thus cannot be applied to substrates for which transparency is required.

On the other hand, silane coupling agents are used for surface modification of inorganic materials, such as metal surfaces, but they are not suitable for the surface modification of organic materials, so that there are limitations to their use.

In digital video disks (DVD), which are an example of a high high-density recording medium that can be written and read optically, the recording layer is formed on a substrate of polycarbonate. Information is optically written or optically read through a transparent resin layer, and for protection against scratches or the like, the surface of the DVD is covered with a protective layer including a resin film material.

However, this protective layer has the propensity to be easily stained. In high-density recording media, recording errors and reading errors due to staining of the surface are a concern, and as the recording density increases, the effect of such stains becomes large as well. For example, there is the problem that when the high-density recording medium is touched by someone's finger, oil is transferred from the finger to the recording medium. Also, high-density recording media conventionally are stored in cases, but in future, it can be assumed that they will be removed by hand from the cases for use, like compact disks, and there is accordingly a demand for a countermeasure against staining. In particular, recent DVD disks use blue laser light for high-density recording and reading, so that there is the risk that stains due to fingerprints cause critical defects. Consequently, there is a need for the prevention of stains on optical disk surfaces.

SUMMARY OF THE INVENTION

To solve the aforementioned problems, it is an object of the present invention to provide an optical information recording medium, on which a stain-resistant film is formed on the optical disk surface, which is not easily stained, and from which stains can be removed easily, as well as a method for manufacturing the same.

In accordance with the present invention, an optical information recording medium comprises a reflective film, a recording film and a protective film on a substrate, wherein the protective film is provided in a surface layer on a side opposite to the substrate;

wherein, on an outer layer of at least one selected from the substrate and the protective film, a hard coat resin layer is formed; and wherein, on an outer layer of the hard coat resin layer, a chemisorptive film comprising organic silane molecules represented by the general formula $R_{4-m-n}SiR'_m Z_n$—(wherein R is a group including a carbon chain with a carbon number of 3 to 25, Z is O, N or S, n is 1, 2 or 3, R' is hydrogen or an alkyl group with a carbon number of 1 to 3, and m is 0, 1 or 2) is formed by covalent bonding with the hard coat layer.

In accordance with the present invention, a method for manufacturing an optical information recording medium comprising a reflective film, a recording film and a protective film on a substrate, wherein the protective film is provided with a surface layer on a side opposite to the substrate, comprises:

spin-coating, onto an outer layer of at least one selected from the substrate and the protective film, an application solution comprising a hard coat resin material, and forming a hard coat resin film by curing it; and spin-coating a chemisorptive film material comprising an organic silane compound represented by the general formula $R_{4-m-n}SiR'_m X_n$—(wherein R is a group including a carbon chain with a carbon number of 3 to 25, X is a halogeno group, an alkoxy group, an isocyanate group or an ester group, n is 1, 2 or 3; n is 1, 2 or 3; R' is hydrogen or an alkyl group with a carbon number of 1 to 3; and m is 0, 1 or 2) while the resin film surface is dry; and causing an elimination reaction between reactive groups of the organic silane compound and active hydrogen of the hard coat resin film surface, so that covalently bonding the organic silane molecules to the hard coat layer.

BRIEF DESCRIPTION OF THE DRAWINGS

FIG. 5A is a cross-sectional diagram directly after oil from a finger has adhered, and FIG. 5B is a cross-sectional diagram showing the state after five days have passed.

DETAILED DESCRIPTION OF THE INVENTION

Figure 1:
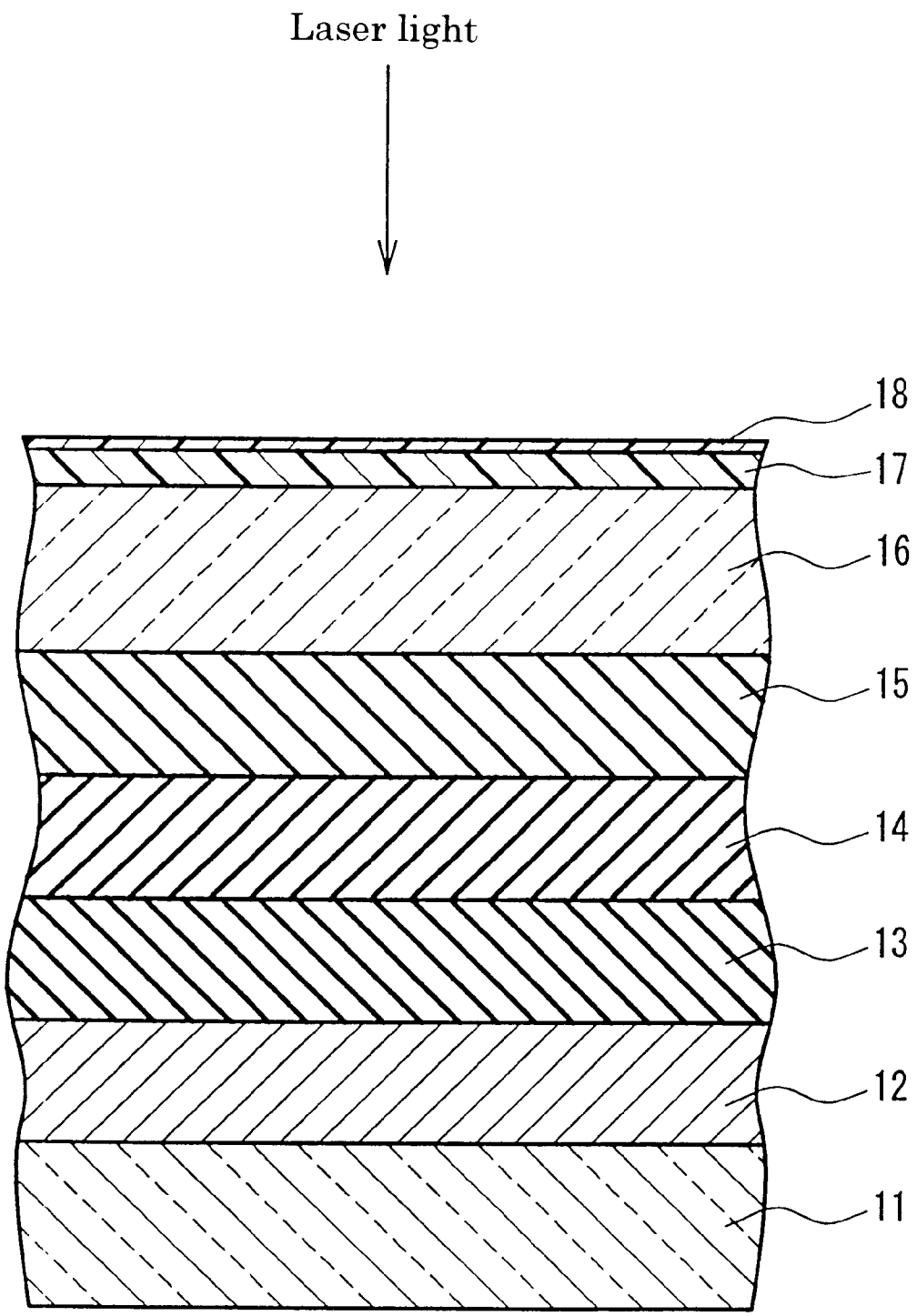
FIG. 1 is a cross-sectional view showing an optical information recording medium in accordance with Working Example 1 of the present invention, in which a hydrocarbon-based chemisorptive film has been formed on a light-cured hard coat resin film.

The following two approaches can be taken to remove stains caused by adhering oil from fingers or in order to prevent the effect of such stains.

The first approach is to provide the surface with oil-repellency. When oil adheres to such a surface, the oil assembles in form of oil drops, so that the oil can be removed easily from the surface, and stains can be eliminated easily by wiping them off. Also water-soluble stains are repelled, so that such stains also can be removed easily by wiping them off. Such a surface can be achieved by covering it with fluorine. However, when oily stains such as fingerprints are left to coagulate, they may easily turn into large defects.

A second approach is to disperse the oil film by spreading the oil over the surface and thus making the stains non-conspicuous. With such a surface, oil spreads evenly across the entire surface. Furthermore, since water-soluble stains are repelled, they can be removed easily by wiping them off, for example. Such a surface can be achieved by covering with molecules including hydrocarbons. The present invention adopts the second approach.

Silane coupling agents that have a hydrolytic group at one molecule end, such as an isocyanatosilyl group, an alkoxysilyl group, a halogenosilyl group, or a silyl ester group, are reactive compounds. In particular, isocyanatosilyl groups and halogenosilyl groups are very reactive. Bringing the surface of such a compound into contact with a substrate including active hydrogen causes an elimination reaction, so that a thin film can be formed. Here, "elimination reaction" means a dehydrohalogenation reaction if the compound includes a halogenosilyl group, a deisocyanation reaction if the compound includes a isocyanatosilyl group, a dealcoholization reaction if the compound includes a alkoxysilyl group, and a deesterification reaction if the compound includes an silyl ester group. Films in which a large number of molecules are aligned by such an elimination reaction are also known to the person skilled in the art as chemisorptive films or "self assembling films."

In the present invention, hydrocarbon groups can be exposed at the surface by using a hydrocarbon-based silane coupling agent. Exposing hydrocarbon groups at the surface is preferable, because this can disperse fatty acid stains such as fingerprints so that they do not obstruct the irradiation or reflection of laser light. That is to say, when fingerprints adhere to the coating, there is a strong affinity between the coating and the fingerprints, whose main components are lipids, because the coating is lipophilic. As a result, the adhered fingerprints are dispersed on the coating. That is to say, a layer that is mainly composed of lipids forms on the portion where fingerprints adhere. As the fingerprints spread out over the lipophilic coating, the layer widens, so that a thin film that is mainly composed of lipids is formed on top of this coating. Consequently, the fingerprints themselves become non-conspicuous, and the stains on the substrate can be prevented from being conspicuous.

Regarding the lipophilic property of the coating, it is preferable that the coating is lipophilic with respect to lipid components stemming from living organisms. The main reason for stains on the protective film layer of optical information media is fingerprints, which are composed of lipid components stemming from living organisms, such as skin fat, so that making the coating lipophilic with respect to lipid components can more effectively make such stains non-conspicuous.

It is preferable that the stain-resistant chemisorptive film of the present invention is provided with a surface energy of at least 15 mN/m and at most 70 mN/m. Providing the coating with a surface energy in this range improves the wettability of the coating, and if lipid components stemming from living organisms, such as skin oil, adhere to the surface of the coating, the coagulation of such lipid components can be overcome and they can be easily spread over the surface of the coating.

More specifically, the surface energy of the coating can be controlled to be in this range by using a substance including hydrocarbon groups or a substance including ester groups for the film material. Even more specifically, if the chemisorptive film is made of molecules including hydrocarbon groups, the range becomes 15 mN/m to 40 mN/m, and if the chemisorptive film is made of molecules including ester groups, the range becomes 30 mN/m to 70 mN/m.

It is preferable that the thickness of the chemisorptive film is at least 0.1 nm and at most 0.5 μm.

As an example of a lipophilic coating, the following is an explanation of coating molecules that are chemically bonded chemisorptive molecules including hydrophilic and lipophilic groups as the functional groups. The stain-resistant coating includes at least lipophilic groups, the lipophilic groups are oriented away from the substrate, and a portion of the molecules is made of aggregate groups of molecules that are chemically bonded to the substrate.

Examples of lipophilic functional groups that can be included in the chemisorptive substance include hydrocarbon groups such as fatty acid ester groups, and aromatic ester groups, for example. Fatty acid ester groups are preferable, because they are structurally similar to lipid components stemming from living organisms.

There is no particular limitation regarding the chemisorptive substance including fatty acid ester groups, and any chemisorptive substance including fatty acid ester groups known in the art can be used, but chemisorptive substances including a fatty acid ester group represented by

  (1)

are preferable. Here, R' and R" denote saturated or unsaturated, straight-chain or branched aliphatic hydrocarbon groups with a carbon number of 1 to 25. R' and R" can be the same hydrocarbon group or they can be different hydrocarbon groups.

It is preferable that the total carbon number of R' and R" is about 2 to 30, because of easier handling. In the case of unsaturated aliphatic hydrocarbon groups, the molecules can include at least one double bond and/or triple bond.

The chemisorptive substance including such fatty acid ester groups can be used alone or in combinations of two or more.

Of R' and R", R' has the larger influence on the lipophilic property of the coating. It is possible to change the extent of the lipophilic property of the coating by choosing a suitable hydrocarbon group for R'. For example, to achieve a lipophilic property with respect to lipid components stemming from living organisms, it is preferable to include fatty acid ester groups such as capronic acid ester groups, caprylic acid ester groups, caprinic acid ester groups, lauric acid ester groups, myristic acid ester groups, palmitic acid ester groups, stearic acid ester groups, arachidic acid ester groups, oleic acid ester groups, erucic acid ester groups, linoleic acid ester groups or linolenic acid ester groups, with regard to their affinity.

The following is an explanation of another example of a lipophilic coating, in which a further lipophilic substance is dispersed in the substance constituting the coating. Also in this case, the lipophilic substance acts similarly to the lipophilic functional groups included in substance constituting the above-described coating, so that stains can be prevented.

Examples of preferable lipophilic substances to be dispersed include fatty acids, and more specifically, stearic acids, oleic acids, linoleic acids, linolenic acids, and palmitic acids.

To produce a coating in which a further lipophilic substance is dispersed in the film constituting substance, it is possible to layer the film constituting substance in which the lipophilic substance has been dispersed.

The following is an explanation of a method for manufacturing a stain-resistant coating in accordance with the present invention. An example of a stain-resistant coating using a chemisorptive substance including hydrophilic and lipophilic groups is explained with reference to the drawings.

First, a chemisorptive substance including hydrophilic and lipophilic groups, for example a chemisorptive substance including a functional group represented by $$A\text{—}SiX_qY_p \qquad (2)$$

is dissolved in a non-aqueous organic solvent to prepare an adsorptive solution (adsorptive solution preparation step). In formula (2), A is an organic group including an aliphatic ester represented by the general formula (1), X is a halogeno group, an alkoxy group, an isocyanate group or an ester group, Y is hydrogen or an alkyl group with a carbon number of 1 to 3, q is 1, 2 or 3, and p+q is 3.

It is preferable that the preparation of the adsorptive solution is carried out in a dry atmosphere of not more than 35% relative humidity.

For the non-aqueous organic solvent, a solvent is used that does not invade the substrate or the protective film (hard coat film) of the optical information recording medium. More specifically, suitable examples include siloxanes, such as non-aqueous dimethyl silicone and non-aqueous hexamethyl disiloxane.

These non-aqueous organic solvents can be used alone or in combinations of two or more.

The hard coat film means the film having wear resistance, and cannot be damaged by rubbing with a cloth. For the surface hardness is particularly important, a curable resin is preferred. For example, a simple or complex system of the acrylic resin, silicone resin, epoxy resin, polyurethane resin and melamine resin is preferably used. Where various properties such as the surface hardness, the heat resistance, the chemical resistance, and transparency, etc., are taken into consideration, the silicone resin preferably is used as the organic polymer.

Next, the adsorptive solution produced in the adsorptive solution preparation step is brought into contact with the protective film side of the optical information recording medium (coating formation step). Thus, the chemisorptive substance is fastened by chemisorption to the surface of the protective film (hard coat film). For example, if trichlorosilyl groups (—SiCl$_3$ groups) are used as reactive groups of the chemisorptive molecules, they undergo a condensation reaction with the functional groups (in this case hydroxyl groups) including active hydrogen that are present in large numbers in the surface of the hard coat film, and a dehydrochlorination reaction occurs, forming siloxane bonds. This reaction can be represented by the chemical equation $$A\text{—}SiCl_3 + HO\text{—}|\text{ hard coat film} \rightarrow A\text{—}SiCl_2\text{—}O\text{—}|\text{ hard coat film} \qquad (3)$$

The coating obtained in this step is a monomolecular film made of aggregate groups, in which the lipophilic group side is oriented away from the substrate, wherein some of the molecules are chemically bonded to the hard coat film. Furthermore, unreacted chemisorptive substance adheres to the top of this monomolecular film. Consequently, if it is necessary to remove this unreacted chemisorptive substance, it is preferable to rinse with a non-aqueous solvent.

Furthermore, there is no particular limitation regarding the functional groups including active hydrogen present in the substrate surface, as long as the functional groups can supply hydrogen, and suitable examples include, besides the aforementioned hydroxyl groups, carboxyl groups, amino groups, thiol groups, sulfine groups and sulfone groups, for example. Furthermore, they also can be functional groups, in which the active hydrogen of the above-mentioned functional groups has been replaced by an alkali metal or alkaline earth metal.

If there are no or only few functional groups including active hydrogen at the substrate surface, then the hard coat film surface should be subjected to a treatment providing it with functional groups including active hydrogen. Such a treatment can be any method known in the art, such as a corona discharge treatment, a UV/ozone treatment, an oxygen plasma treatment, or a treatment with a chemical oxidizing agent such as potassium permanganate solution.

The following is an explanation of the rinsing step. As explained above, in the rinsing step, the unreacted chemisorptive substance remaining on the hard coat film is rinsed off with a non-aqueous organic solvent (rinsing step), thus forming a monomolecular stain-resistant coating of uniform film thickness.

It should be noted that if the rinsing step is not carried out, then the chemisorptive substance adhering to the monomolecular film is not removed, so that a polymer (i.e. not monomolecular) stain-resistant coating may be formed. If it is a thin film, then even such a polymer coating may be useful in practice.

For the organic solvents that can be used for the rinsing, it is possible to use any non-aqueous organic solvent known in the art, including the organic solvents mentioned above. Using a non-aqueous organic solvent prevents the formation of a cross-linked structure in which, due to the presence of lipophilic groups, the molecules bonded directly to the hard coat surface are reacted with one another as well as with the unreacted chemisorptive substance. It is preferable that also the rinsing solution includes a siloxane, such as non-aqueous dimethyl silicone or non-aqueous hexamethyl disiloxane.

For the rinsing, any suitable method known in the art can be used, such as wiping the surface on which the coating has been formed, immersion in the non-aqueous organic solution, application of a mechanical force by ultrasonic processing while immersed in a rinsing agent, or heating the rinsing agent.

There is no particular limitation regarding the rinsing conditions in the rinsing step, and the temperature of the rinsing solution, the number of rinsing cycles, the rinsing time and the amount of rinsing solution can be chosen as appropriate in view of the amount of unreacted chemisorptive substance adhering to the object to be rinsed, or the size, shape and material of the object to be rinsed, and the thickness of the desired coating.

When the resulting coating reacts with water in the air, A—Si(OH)$_2$—O—| substrate is attained, and by further dehydration, the structure A—Si(—O—)$_2$—O—| substrate is attained.

Examples of suitable hard coat resin film materials include hard coat compositions whose main component is a hydrolyzate of a tetra-functional silicon compound or alkyltrialkoxysilane. Other examples are hard coat compositions whose main component is an organic silicon compound or its hydrolyzate as expressed by $R^1_a R^2_b Si(OR^3)_{4-a-b}$, wherein $R^1_a$ and $R^2_b$ respectively are at least one selected from the group of hydrocarbon groups having alkyl groups, alkenyl groups, allyl groups, halogeno groups, epoxy groups, glycido groups, amino groups, mercapto groups, methacryloxy groups and cyano groups, $R^3$ is a hydrolysable group, and a and b are 0 or 1. Examples of heat curable silicone resin hard coat materials are "X-12-2450", "X-12-2206", "X-12-2138A", "KP-50A", "KP-60A" and "KP-854" (used with a primer "PC-7A") manufactured by Shin-Etsu Chemical Co. Ltd. Examples of UV light curable silicone resin hard coat materials are "X-41-2415" and "X-24-2400" manufactured by Shin-Etsu Chemical Co. Ltd. Examples of other hard coat materials are "Z7501" and "KZ7824H" manufactured by JSR Corporation, "SK series" manufactured by Sony Chemicals Corporation, and "SD715" manufactured by Dainippon Ink and Chemicals, Incorporated.

It is preferable that the thickness of the hard coat resin layer is in the range of 0.1 to 100 μm.

Furthermore, it is also possible to form a film with a resin film material made of a light-curing organic polymer material or a heat-curing polymer material, wherein active hydrogen groups are exposed at the film surface when cured. Combining this surface and the silane coupling agent, it is possible to form a uniform coating film made of the silane coupling agent formed on the resin film.

The present invention provides a high-density recording medium that can be used when removed from its case, like a compact disk, even though such recording media conventionally used to be stored in cases.

Examples of an optical disk that can be used in the present invention are write-once CD-R and DVD-R, and rewritable MO, MD, CD-RW, DVD-RAM, DVD-RW and DVD+RW.

Working Examples

The following is an explanation of specific working examples of the present invention, with reference to the accompanying drawings.

Working Example 1

For the disk in this working example, a substrate made of 0.6 mm thick polycarbonate with a diameter of 120 mm having signal recording tracks was used. Grooves and lands were formed in alternation every 0.34 μm in the substrate.

As shown in FIG. 1, an Ag reflective film 12 of 100 nm thickness was formed by sputtering on this disk-shaped polycarbonate substrate 11. As a first dielectric layer 13, a ZnS—SiO$_2$ mixed film of 100 nm thickness was formed by sputtering. As a recording layer 14, a Ge:Sb:Te composition with an atomic % ratio of 20:25:55 was formed at a thickness of 12 nm by sputtering. On the surface of that, a Ta$_2$O$_5$ layer of 50 nm thickness was formed by sputtering as a second dielectric layer 15. And on the surface of that, a light-curing acrylic resin was applied by spin-coating, and formed with UV light into a transparent protective film 16 of 10 μm thickness. This optical information disk constitutes a DVD disk of the type where blue laser light is irradiated from the side of the hard coat film.

Next, a hard coat film 17 was formed on the surface of the transparent protective film 16. The hard coat film 17 was formed by applying a silicon light-curing material (silicone hard coat agent X-12-2450 by Shin-Etsu Chemical Co. Ltd.) by spin-coating, and UV curing it with UV light irradiated from an 80 W low-pressure mercury lamp. The film thickness was 2 μm.

Then, an application solution obtained by dissolving as a silane coupling agent octadecyltricholorosilane (CH$_3$(CH$_2$)$_{17}$SiCl$_3$; manufactured by Chisso Corp.) at a ratio of 1 mass % in straight silicone oil (KF96L by Shin-Etsu Chemical Corp. Ltd.) was spin-coated in a dry atmosphere, and then, by with rinsing with this straight silicone oil solution, a stain-resistant chemisorptive film 18 made of silane coupling agent molecules was formed. The chlorosilyl groups in the resulting chemisorptive film 18 formed covalent bonds with the hard coat film. The film thickness was about 1.5 nm.

When hexadecane was dripped onto the stain-resistant chemisorptive film 18 as an example of oil, its contact angle was 75° to 85°. Furthermore, when water drops were dripped on, their contact angle was 112° to 120°.

When hexadecane was dripped as an example of oil onto a disk sample, and wiped off with a cloth including a solution of several percent isopropyl alcohol mixed into water, the hexadecane on the sample could be removed, and after the solution was dried, no remaining hexadecane could be found.

When such a sample from which hexadecane had been wiped off was subjected to an optical writing operation, there was no operation of rewriting into writing error locations. This means, no writing errors occurred. Another experiment that was performed was that of touching with fingers, and also in that case, writing errors did not occur.

When the substrate was not wiped for comparison (i.e. left in its stained state), rewriting increased to about 500 times, rendering it useless for practice.

Thus, the effect of the present invention was demonstrated.

Working Example 2

Figure 2:
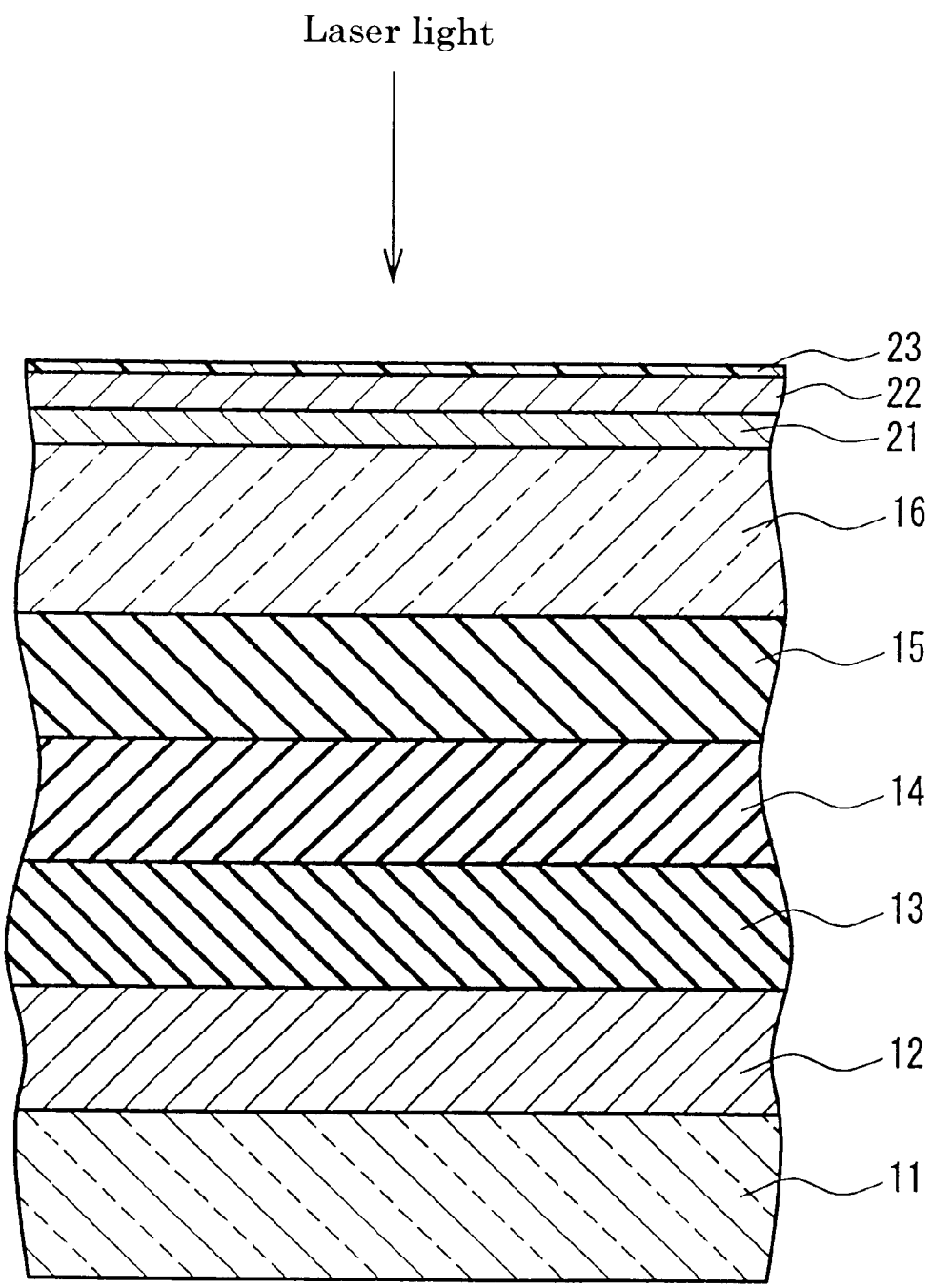
FIG. 2 is a cross-sectional view showing an optical information recording medium in accordance with Working Example 2 of the present invention, in which a hydrocarbon-based chemisorptive film has been formed on a heat-cured hard coat resin film.

Referring to FIG. 2, a primer layer 21, a hard coat layer 22 and a stain-resistant chemisorptive film 23 were formed as follows on the transparent protective film 16 of the optical information disk used in Working Example 1.

First, a primer 21 (PC-7A by Shin-Etsu Chemical Corp. Ltd.) was applied by spin-coating, air-dried for 10 min, and then cured by heating for 30 min to 120° C. The film thickness was 1 μm.

Then, a silicon heat-curing material (silicone hard coat agent KP-851 by Shin-Etsu Chemical Corp. Ltd.) was applied by spin-coating, air-dried for 10 min, and then heat-cured by heating for 60 min to 120° C., forming a hard coat film 22. The film thickness was 2 μm.

Then, an application solution was obtained by dissolving as a silane coupling agent octadecyltricholorosilane (CH$_3$(CH$_2$)$_{17}$SiCl$_3$; manufactured by Chisso Corp.) at 1 mass % in cyclic silicone oil (KF995 by Shin-Etsu Chemical Corp. Ltd.) in a dry atmosphere. This solution was applied by spin-coating, and then rinsed with the cyclic silicone oil, forming a chemisorptive film 23 made of silane coupling agent molecules. This chemisorptive film 23 had a structure in which hydrocarbon groups were exposed at the film surface, and the silyl groups of the silane coupling agent molecules constituting the thin film 23 formed covalent bonds with the hard coat film 22. The film thickness was about 1.5 nm.

When hexadecane was dripped onto the stain-resistant chemisorptive film 24 as an example of oil, its contact angle was less than 15°. Furthermore, when water drops were dripped on, their contact angle was 105 to 115°.

When such a sample onto which hexadecane had been dripped was subjected to an optical writing operation, there were two operations of rewriting into writing error locations. This means, two writing errors occurred. This is a quantity that poses no problem in practice.

Thus, the effect of the present invention was demonstrated.

In this example, octadecyltrichlorosilane was used as the hydrocarbon-based silane coupling agent, but a similar effect can be expected for other silane coupling agents with methyl groups at their end, and tetradecyltrichlorosilane, pentadecyltrichlorosilane, hexadecyltrichlorosilane, heptadecyltrichlorosilane and nonadecyltrichlorosilane also were advantageous.

Working Example 3

Figure 3:
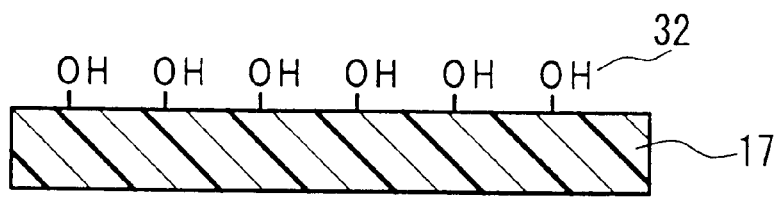
FIG. 3 is a cross-sectional diagram illustrating the surface of an optical information recording medium in accordance with Working Example 3 of the present invention, viewed on the molecule level.

FIG. 3 shows the hard coat film 17 on the surface of the DVD disk described in Working Example 1, magnified to the molecule level. As shown, the active hydrogen of hydroxyl groups 32 is present at the surface.

Instead of the chemisorptive agent of Working Example 1, about 2 mass % of 2-(trichlorosilyl) ethylstearate ($CH_3(CH_2)_{16}COOCH_2CH_2SiCl_3$) were dissolved in a non-aqueous fluorine-based deactivated solution (PF5080 by 3M Corp.), thus preparing a chemisorptive application solution.

Then, this chemisorptive application solution was dropped onto the surface of the hard coat film 17, and applied evenly by spin coating in a dry atmosphere (of not more than 35% relative humidity). Thus, the hydroxyl groups 32 present in large numbers at the surface of the hard coat film 17 shown in FIG. 3 underwent a dehydrochlorination reaction with the chlorosilyl groups (—SiCl groups) included in the above-described chemisorptive solution, and formed chemical bonds via the siloxane bonding groups, as shown in Chemical Equation (4) below.

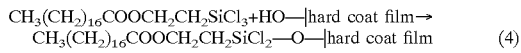

$$CH_3(CH_2)_{16}COOCH_2CH_2SiCl_3 + HO—|\text{hard coat film} \rightarrow$$
$$CH_3(CH_2)_{16}COOCH_2CH_2SiCl_2—O—|\text{hard coat film} \quad (4)$$

Then, spray rinsing was performed with a non-aqueous fluorine-based deactivated solution (PF5080 by 3M Corp.), and the unreacted chemisorptive substance was removed. Furthermore, unreacted Cl groups were substituted by OH groups by rinsing with running water for about 10 min at room temperature.

Then, by drying, a cross-linked structure was formed by a dehydration reaction among the OH groups of neighboring molecules.

Figure 4:
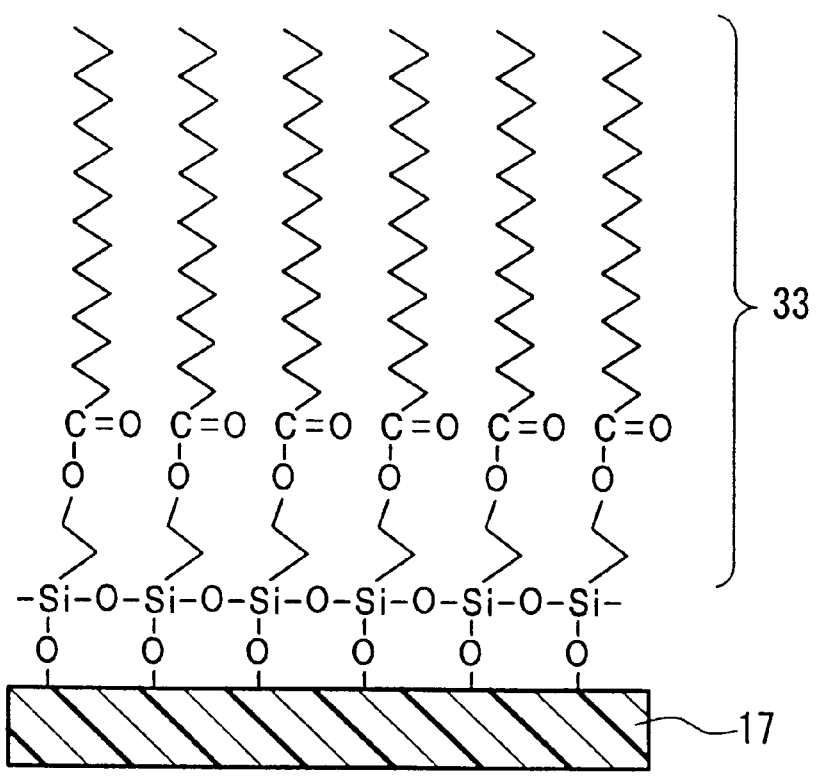
FIG. 4 is a cross-sectional diagram illustrating a chemisorptive monomolecular film in accordance with Working Example 3 of the present invention, viewed on the molecule level.

Thus, a monomolecular film 33 of about 2 nm film thickness including fatty acid ester groups that are chemically bonded to the hard coat surface 17 could be formed as shown in FIG. 4. The stain resistance of the resulting chemisorptive film was similarly superior as that of Working Example 1.

Figure 5A:
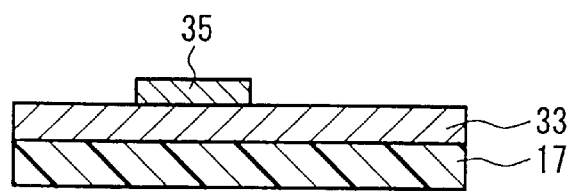
FIGS. 5A and 5B are cross-sectional diagrams illustrating how a stain on the chemisorptive monomolecular film according to Working Example 3 of the present invention disperses.
Figure 5B:
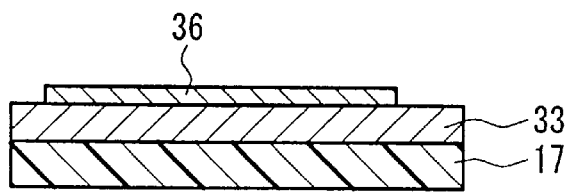

FIGS. 5A and 5B are cross-sectional diagrams schematically showing the temporal change of a finger print stain, illustrating the effect of the stain-resistant chemisorptive film of the present working example. FIG. 5A is a cross-sectional diagram showing the initial state after rubbing off a finger, and FIG. 5B is a cross-sectional diagram showing the state after five days have passed from the state of FIG. 5A.

As shown in FIG. 5A, a fingerprint 35 can be seen initially after rubbing off a finger, but as shown in FIG. 5B, after five days have passed, the lipid components in the fingerprint wet the chemisorptive film 33 and spread out thinly over an area that is about ten times as large, forming the dispersed fingerprint 36. Spread out like this, they do not have an adverse influence on the irradiation with laser light. It should be noted that the surface energy of the monomolecular film 33 was about 35 mN/m.

Working Example 4

Figure 6:
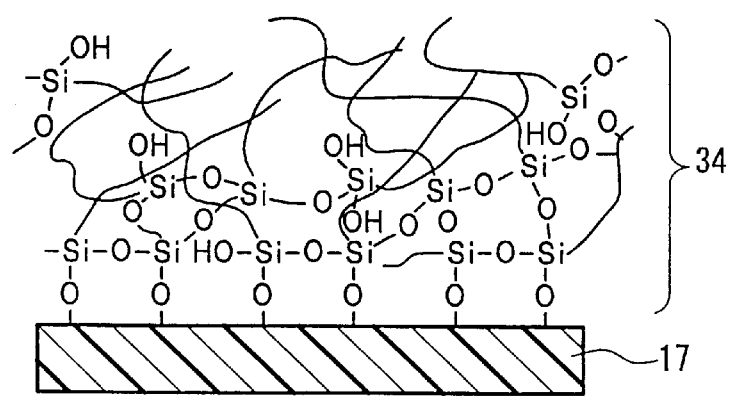
FIG. 6 is a cross-sectional diagram illustrating a chemisorptive polymer film in accordance with Working Example 4 of the present invention, viewed on the molecule level.

FIG. 6 is a cross-sectional diagram showing the polymer stain-resistant chemisorptive film 34 formed on the hard coat surface 17 used in Working Example 3 of the present invention, viewed at to the molecule level.

In Working Example 3, the unreacted chemisorptive substance was removed by rinsing, but in this working example, the unreacted chemisorptive substance was not removed by rinsing, but left as is. Other aspects except for the rinsing were as in Working Example 3. As a result, a polymer coating 34 of 100 to 300 nm thickness that was bonded through siloxane bonding groups could be formed. The stain resistance of the resulting chemisorptive film was similarly superior as that of Working Example 1.

In Working Examples 3 and 4, stearic acid ester groups were used as the fatty acid ester groups, but substantially the same results could be achieved when using a chemisorptive substance including fatty acid ester groups such as palmitic ester groups, arachidic acid ester groups, oleic acid ester groups, erucic acid ester groups, linoleic acid ester groups or linolenic acid ester groups.

Working Example 5

The surface of the hard coat film 17 of FIG. 1 was subjected to a corona treatment for about 30 sec at 200W (excimer UV treatment in air at about 1500 mJ/cm² irradiation), to make the surface hydrophilic.

About 1 mass % of 2-(trichlorosilyl)ethyl linoleate ($CH_3(CH_2)_4CH=CHCH_2CH=CH(CH_2)_7COOCH_2CH_2SiCl_3$), which is a chemisorptive substance, was dissolved in dimethyl silicone, which is a non-aqueous solvent, preparing a chemisorptive application solution.

Then, this chemisorptive application solution was dropped onto the surface of the hard coat film, which had been made hydrophilic as described above, and applied evenly by spin coating in a dry atmosphere (18% relative humidity). Then, the surface was rinsed with dimethyl silicone, which is a non-aqueous solvent, rinsed with water, and dried. Thus, the chemisorptive substance was chemically bonded through siloxane bonding groups, as shown in Chemical Formula (5) below.

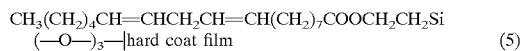

$$CH_3(CH_2)_4CH=CHCH_2CH=CH(CH_2)_7COOCH_2CH_2Si$$
$$(—O—)_3—|\text{hard coat film} \quad (5)$$

The film thickness of the resulting chemisorptive monomolecular film was about 2 nm. The stain resistance of the resulting chemisorptive film was similarly superior as that of Working Example 1.

Working Example 6

In Working Example 5, the unreacted chemisorptive substance was removed by rinsing, but in this working example, the unreacted chemisorptive substance was not removed by rinsing, but left as is. Other aspects except for the rinsing were as in Working Example 5. As a result, a polymer coating of about 200 nm thickness was formed. The stain resistance of the resulting chemisorptive film was similarly superior as that of Working Example 1.

Working Example 7

(1) Preparation of hard coat film application solution composition 95.3 g γ-glycidoxypropyltrimethoxysilane were put into a reactor fitted with a rotor, and 21.8 g of a 0.01N aqueous hydrochloric acid solution were dripped in little by little while keeping the temperature of the liquid at 10° C. and stirring with a magnetic stirrer. After the dripping, the cooling was stopped, thus obtaining a hydrolyzate of γ-glycidoxypropyltrimethoxysilane. 216 g methanol, 216 g dimethylformamide, 0.5 g fluorine-based surfactant, and 67.5 g bisphenol A epoxy resin (by Shell Chemicals Corp., trademark "Epicoat 827") were admixed to this hydrolyzate. Furthermore, 270 g colloidal antimony pentaoxide sol (by Nissan Chemicals Corp., trademark "Antimonsol A-2550", 60 nm particle size) and 13.5 g aluminum acethylacetonate serving as a catalyst were added, and after sufficiently stirring, a coating solution was obtained. This coating solution is referred to as "hard coat film application solution composition."

(2) Formation of hard coat resin film

Figure 7:
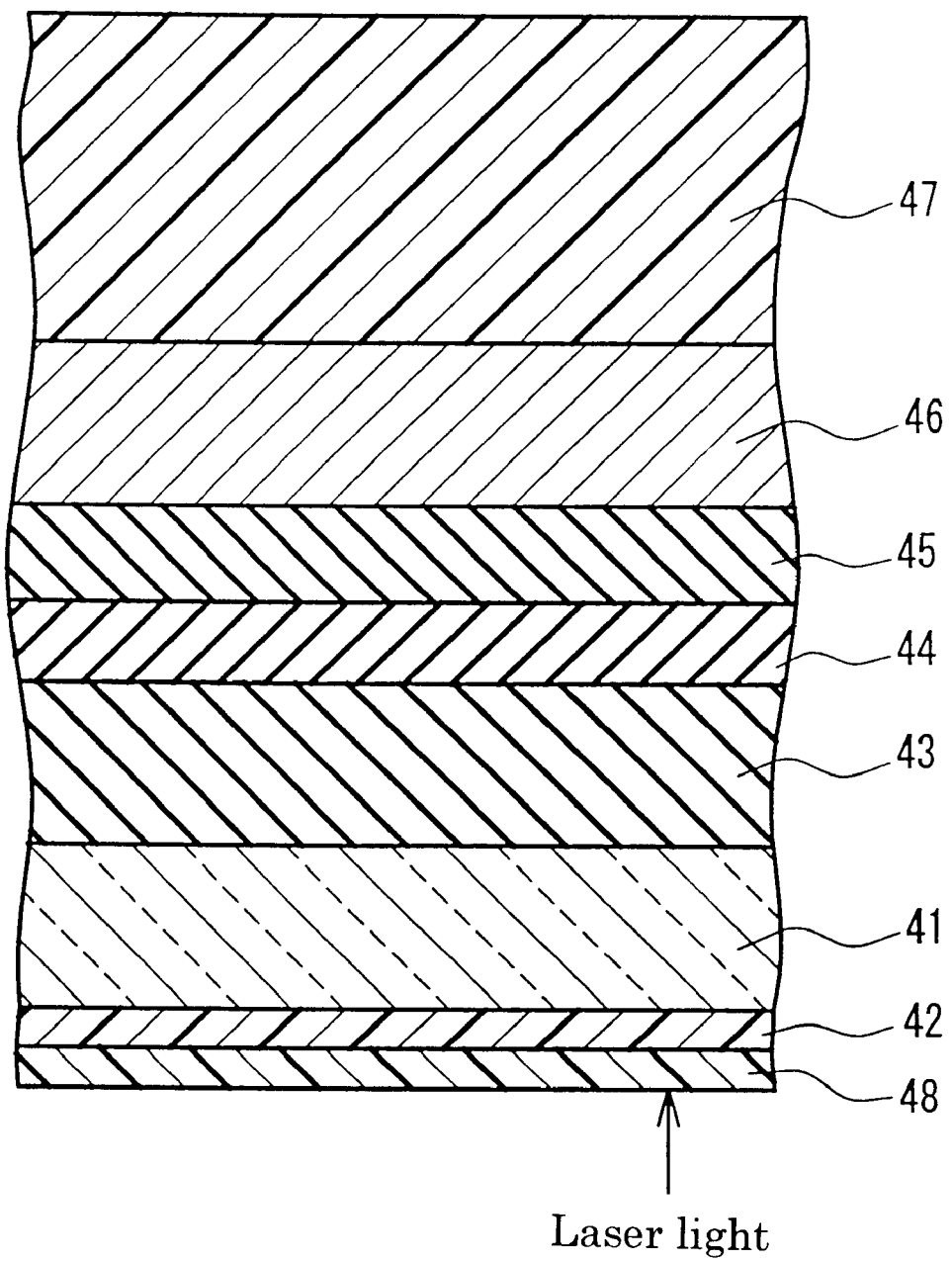
FIG. 7 is a cross-sectional diagram illustrating a chemisorptive monomolecular film in accordance with Working Example 6 of the present invention, viewed on the molecule level.

The hard coat film application solution composition was dropped onto the outer surface of a disk substrate 41 made of 0.6 mm thick polycarbonate, as shown in FIG. 7, with a diameter of 120 mm having signal recording tracks in which grooves and lands were formed in alternation every 0.34 μm, the solution composition was applied evenly by spin-coating, and was then subjected to precuring for 12 min at 82° C. and a curing reaction for 4 hours at 93° C. The thickness of the resulting hard coat resin film 42 was 5 μm.

(3) Formation of optical information recording medium

As shown in FIG. 7, a ZnS—$SiO_2$ mixed film of 100 nm thickness was formed as a first dielectric layer 43 by sputtering on the disk-shaped polycarbonate substrate 41. On top of that, a Ge:Sb:Te composition with an atomic % ratio of 20:25:55 was formed as a recording layer 44 at a thickness of 12 nm by sputtering. On the surface of that, a $Ta_2O_5$ layer of 50 nm thickness was formed by sputtering as a second dielectric layer 45. On the surface of that, an Ag reflective layer 46 was formed at a thickness of 100 nm by sputtering. And on the surface of that, a transparent polycarbonate sheet 47 of 0.1 mm thickness was adhered with an epoxy resin adhesive. The obtained optical information disk was a DVD disk of the type where blue laser light is irradiated from the side of the substrate 41.

(4) Formation of chemisorptive film

Then, an application solution was obtained by dissolving as a silane coupling agent octadecyltricholorosilane ($CH_3$($CH_2$)$_{17}$$SiCl_3$; manufactured by Chisso Corp.) at 1 mass % in cyclic silicone oil (KF995 by Shin-Etsu Chemical Corp. Ltd.) in a dry atmosphere. This solution was applied by spin-coating to the surface of the hard coat resin film 42, and then rinsed with the cyclic silicone oil, forming a chemisorptive film 48 made of silane coupling agent molecules. This chemisorptive film 48 had a structure in which hydrocarbon groups were exposed at the film surface, and the silyl groups of the silane coupling agent molecules constituting the film 48 formed covalent bonds with the hard coat film 42. The film thickness was about 1.5 nm. The stain resistance of this chemisorptive film was similarly superior as that of Working Example 1.

Working Example 8

A primer layer was formed in accordance with Working Example 2, and a hard coat film was formed on top of the primer layer. This hard coat film was made of a silicone material and had a large number of hydroxyl groups exposed at its surface. Next, a coating film made of a silane coupling agent was formed using a decyltrichlorosilane as in Working Example 2. Then, the critical surface energy of this coating film surface was determined. For this, several samples were produced by mixing ethylene glycol and water at a suitable proportion, drops of the samples were dripped onto the coating film, the drops formed a certain contact angle on the coating film, and the sine of this angle was determined. To derive the surface energy of the samples with the mixing ratio of the samples, the surface energy of the samples was plotted against the X axis and the sine of the contact angle formed by the sample drops on the coating film against the Y axis, and taking the intersection of the extension of the line defined by the plotted points with the X axis (Y=0) as the critical surface energy of the coating film, the value determined for this working example was 23 mN/m.

Optical Writing Test

Coating films were formed using several kinds of silane coupling agents on substrates on which the hard coat film had been formed in accordance with Working Example 2, and the critical surface energy imparted by the substrates was determined. The results are shown in Table 1. Also, hexadecane was dripped on as an oily liquid, the wettability was confirmed, and the suitability for optical writing was expressed as "accept" or "reject".

It should be noted that this optical writing test is more important than an optical reading test, and samples that pass the optical writing test also pass the optical reading test.

TABLE 1

| Sample No. | silane coupling agent | Critical surface energy (mN/m) | Main groups exposed at surface | result |
| --- | --- | --- | --- | --- |
| 1 | tridecafluoro-1,1,2,2-tetrahydro-octyl trichlorosilane | 8 | $CF_3$ | reject |
| 2 | 3-fluorine-propyltrimethoxysilane | 15 | $CH_2F$ | accept |
| 3 | octadecyltrichlorosilane | 23 | $CH_3$ | accept |
| 4 | aryldimethylchlorosilane | 33 | $CH_2$ | accept |
| 5 | 3-chloropropyltrichlorosilane | 40 | $CH_2Cl$ | accept |
| 6 | 3-mercaptopropyltrimethoxysilane | 68 | SH | reject |

In view of the results for the spread of the wettability, for chemisorptive films made of molecules including hydrocarbon groups, a preferable range of critical surface energies is 15 mN/m to 40 mN/m, and it was confirmed that it is important to choose a coating substance that can achieve such a critical surface energy. It is important to note that there is no limitation to the coupling agents used here, and that it is sufficient to use a coating with a substance that can achieve a critical surface energy within this range of critical surface energies. Surfaces in which carbon fluorides are exposed do not pass the optical writing test, but this is because the spreadability of the wetting is judged, and it is clear that there is no problem at all with optical writing operations, if the oil compound can be completely removed as described in Working Example 1. Thus, it seems that surfaces from which stains can be removed and surfaces that spread wettings are at least partially complementary. Particularly preferable critical surface energies within the above-noted range of critical surface energies were values from 23 mN/m to 33 mN/m.

The invention may be embodied in other specific forms without departing from the spirit or essential characteristics thereof The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. An optical information recording medium comprising a reflective film, a recording film and a protective film on a substrate, wherein the protective film is provided in a surface layer on a side opposite to the substrate;

wherein, on an outer layer of at least one selected from the substrate and the protective film, a hard coat resin layer is formed; and wherein, on an outer layer of the hard coat resin layer, a chemisorptive film comprising organic silane molecules represented by the general formula $R_{4-m-n}SiR'_mZ_n$—(wherein R is a group including a carbon chain with a carbon number of 3 to 25, Z is O, N or S, n is 1, 2 or 3, R' is hydrogen or an alkyl group with a carbon number of 1 to 3, and m is 0, 1 or 2) is formed by covalent bonding with the hard coat layer.

2. The optical information recording medium according to claim 1, wherein the hard coat resin layer is a cured silicone resin layer.

3. The optical information recording medium according to claim 2, wherein the cured silicone resin layer is at least one cured layer selected from a light-cured layer and a heat-cured layer.

4. The optical information recording medium according to claim 1, wherein R is at least one selected from a hydrocarbon group and a fatty acid ester group.

5. The optical information recording medium according to claim 1, wherein the surface of the chemisorptive film is lipophilic.

6. The optical information recording medium according to claim 1, wherein a thickness of the chemisorptive film is at least 0.1 nm and at most 0.5 μm.

7. The optical information recording medium according to claim 1, wherein a surface energy of the chemisorptive film is at least 15 mN/m and at most 70 mN/m.

8. The optical information recording medium according to claim 4, wherein the fatty acid ester group is at least one selected from capronic acid ester groups, caprylic acid ester groups, caprinic acid ester groups, lauric acid ester groups, myristic acid ester groups, palmitic acid ester groups, stearic acid ester groups, arachidic acid ester groups, oleic acid ester groups, erucic acid ester groups, linoleic acid ester groups or linolenic acid ester groups.

9. The optical information recording medium according to claim 1, wherein a thickness of the hard coat film is in the range of 0.1 to 100 μm.

10. The optical information recording medium according to claim 1, further comprising a primer layer between the protective film and the hard coat resin film.

11. A method for manufacturing an optical information recording medium comprising a reflective film, a recording film and a protective film on a substrate, wherein the protective film is provided in a surface layer on a side opposite of the substrate, the method comprising:

spin-coating, onto an outer layer of at least one selected from the substrate and the protective film, an application solution comprising a hard coat resin material, and forming a hard coat resin film by curing it;

spin-coating a chemisorptive film material comprising an organic silane compound represented by the general formula $R_{4-m-n}SiR'_mX_n$—(wherein R is a group including a carbon chain with a carbon number of 3 to 25, X is a halogeno group, an alkoxy group, an isocyanate group or an ester group, n is 1, 2 or 3; n is 1, 2 or 3; R' is hydrogen or an alkyl group with a carbon number of 1 to 3; and m is 0, 1 or 2) while the resin film surface is dry; and causing an elimination reaction between reactive groups of the organic silane compound and active hydrogen of the hard coat resin film surface, thereby covalently bonding the organic silane molecules as a thin film to the hard coat layer.

12. The method for manufacturing an optical information recording medium according to claim 11, further comprising removing of remaining organic silane compound after spin-coating the organic silane compound.

13. The method for manufacturing an optical information recording medium according to claim 11, wherein the hard coat resin layer is a cured silicone resin layer.

14. The method for manufacturing an optical information recording medium according to claim 11, wherein the curing of the hard coat resin is carried out by at least one selected from light-curing and heat-curing.

15. The method for manufacturing an optical information recording medium according to claim 11, wherein X is at least one group selected from the group consisting of isocyanate groups, alkoxy groups, halogen and ester groups.

16. The method for manufacturing an optical information recording medium according to claim 11, wherein the active hydrogen at the surface of the hard coat resin film is the hydrogen in at least one group selected from —OH, —NH$_2$, —NH, —COOH, and —SH.

17. The method for manufacturing an optical information recording medium according to claim 11, wherein R is at least one selected from a hydrocarbon group and a fatty acid ester group.

18. The method for manufacturing an optical information recording medium according to claim 11, wherein the surface of the coating film is lipophilic.

19. The method for manufacturing an optical information recording medium according to claim 11, wherein a thickness of the thin film formed by the organic silane molecules is at least 0.1 nm and at most 0.5 μm.

20. The method for manufacturing an optical information recording medium according to claim 11, wherein a surface energy of the formed by the organic silane molecules is at least 15 mN/m and at most 70 mN/m.

21. The method for manufacturing an optical information recording medium according to claim 17, wherein the fatty acid ester group is at least one selected from capronic acid ester groups, caprylic acid ester groups, caprinic acid ester groups, lauric acid ester groups, myristic acid ester groups, palmitic acid ester groups, stearic acid ester groups, arachidic acid ester groups, oleic acid ester groups, erucic acid ester groups, linoleic acid ester groups or linolenic acid ester groups.

* * * * *

UNITED STATES PATENT AND TRADEMARK OFFICE
CERTIFICATE OF CORRECTION

PATENT NO. : 6,706,359 B2
DATED : March 16, 2004
INVENTOR(S) : Mino et al.

Page 1 of 1

It is certified that error appears in the above-identified patent and that said Letters Patent is hereby corrected as shown below:

Column 14,
Line 4, delete second occurrence of "n is 1, 2 or 3;"

Signed and Sealed this

Nineteenth Day of October, 2004

JON W. DUDAS
*Director of the United States Patent and Trademark Office*